United States Patent
Yamashita

(10) Patent No.: US 9,366,849 B2
(45) Date of Patent: Jun. 14, 2016

(54) MICROSCOPE SYSTEM AND METHOD FOR MICROSCOPE SYSTEM

(71) Applicant: OLYMPUS CORPORATION, Shibuya-ku, Tokyo (JP)

(72) Inventor: Yusuke Yamashita, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/502,540

(22) Filed: Sep. 30, 2014

(65) Prior Publication Data

US 2015/0092265 A1 Apr. 2, 2015

(30) Foreign Application Priority Data

Oct. 1, 2013 (JP) ................................. 2013-206433

(51) Int. Cl.
*G02B 21/02* (2006.01)
*G02B 21/00* (2006.01)
*G02B 21/24* (2006.01)
*G02B 21/26* (2006.01)

(52) U.S. Cl.
CPC .......... *G02B 21/0032* (2013.01); *G02B 21/008* (2013.01); *G02B 21/0076* (2013.01); *G02B 21/0088* (2013.01); *G02B 21/24* (2013.01); *G02B 21/26* (2013.01)

(58) Field of Classification Search
CPC ........... G02B 21/0032; G02B 21/0076; G02B 21/008; G02B 21/0088; G02B 21/24; G02B 21/26
USPC ................................................. 359/380–383
See application file for complete search history.

(56) References Cited

U.S. PATENT DOCUMENTS

| | | | | | |
|---|---|---|---|---|---|
| 5,790,710 | A | * | 8/1998 | Price | G01N 15/147 250/201.3 |
| 5,932,872 | A | * | 8/1999 | Price | G01N 15/147 250/201.3 |
| 6,724,419 | B1 | * | 4/2004 | Green | G02B 21/367 348/79 |
| 6,995,901 | B2 | * | 2/2006 | Heffelfinger | G02B 21/16 356/417 |
| 2006/0050376 | A1 | * | 3/2006 | Houston | G02B 21/365 359/392 |
| 2012/0312957 | A1 | * | 12/2012 | Loney | G02B 21/245 250/201.3 |
| 2014/0178169 | A1 | * | 6/2014 | Hebert | B01L 9/52 414/752.1 |

FOREIGN PATENT DOCUMENTS

JP 2011237818 A 11/2011

* cited by examiner

*Primary Examiner* — Frank Font
(74) *Attorney, Agent, or Firm* — Holtz, Holtz & Volek PC

(57) ABSTRACT

A desired observation timing is ensured, and simultaneity of observation among different observation positions is ensured. Provided is a microscope system including an electrically powered stage, a scanner, objective lenses, a revolver, an image-acquisition portion, an autofocus portion, a first storage portion that stores one of the focal positions of the low-magnification objective lens as a reference position, a focal-position setting portion that sets a focal position at which an image is acquired with reference to the reference position for the low-magnification objective lens, an acquisition-position setting portion that sets acquisition positions for partial images, and a map-image generating portion that generates a map image based on the partial images acquired at the set focal position, wherein the autofocus portion detects a focal position of the high-magnification objective lens at an observation position set on the map image with reference to the reference position for the low-magnification objective lens.

12 Claims, 7 Drawing Sheets

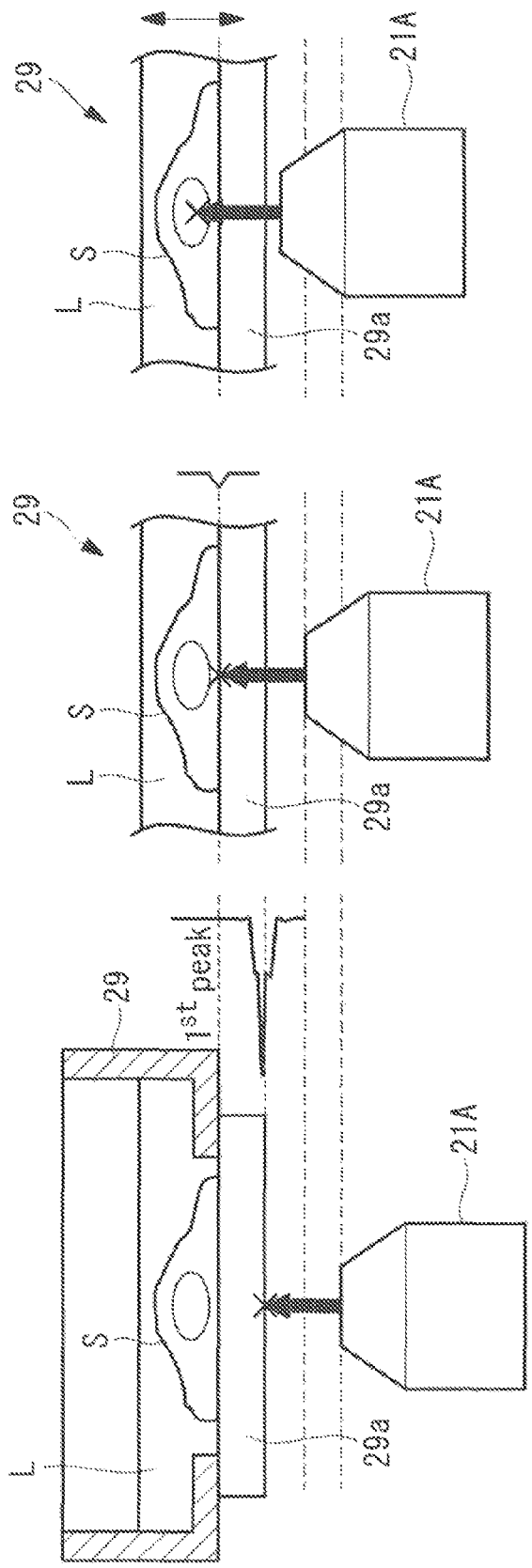

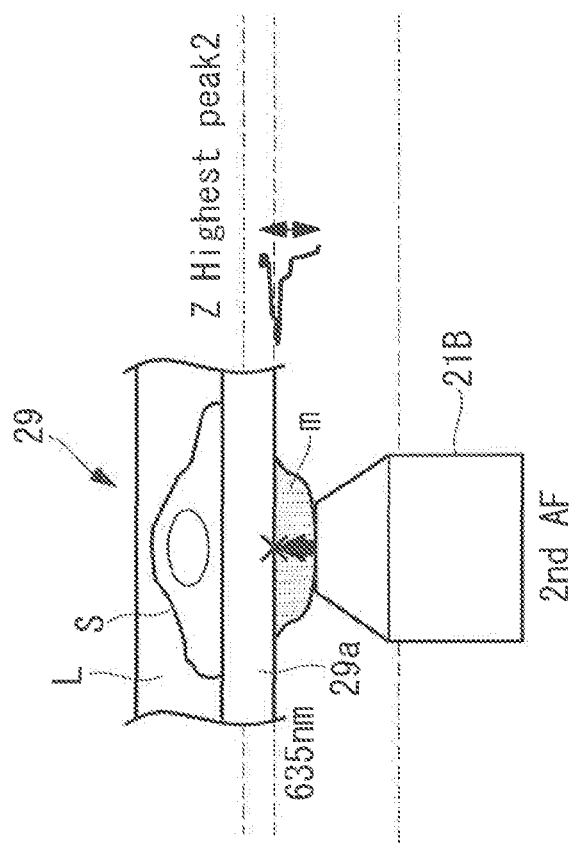
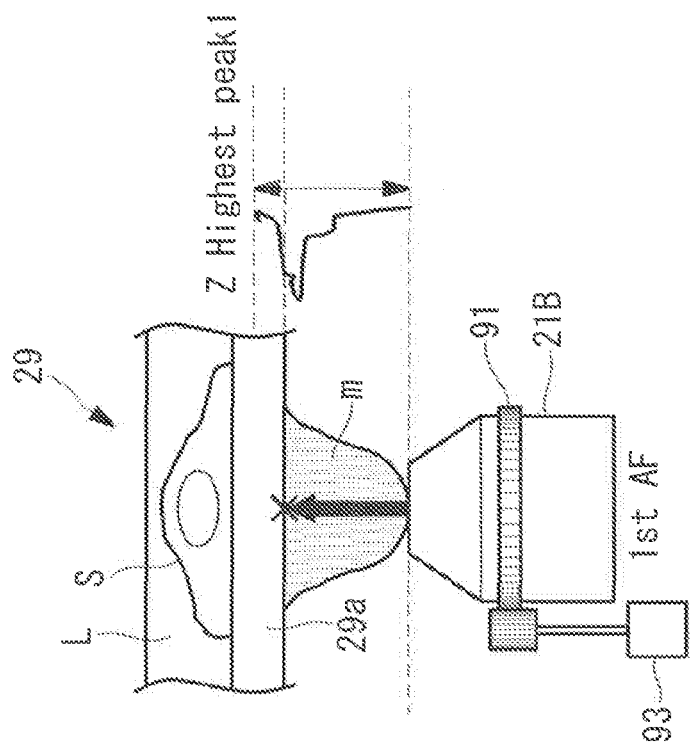
FIG. 7A
FIG. 7B

MICROSCOPE SYSTEM AND METHOD FOR MICROSCOPE SYSTEM

CROSS-REFERENCE TO RELATED APPLICATIONS

This application is based on Japanese Patent Application No. 2013-206433, the contents of which are incorporated herein by reference.

TECHNICAL FIELD

The present invention relates to a microscope system and a method for a microscope system.

BACKGROUND ART

In the related art, there are known microscope systems for performing so-called time-lapse observation in which images of a sample are acquired by photographing the sample at a certain time interval (for example, see Patent Literature 1). With the microscope system disclosed in Patent Literature 1, Z-positions that serve as references for individual objective lenses are independently detected while moving the focal plane in the Z-axis direction, that is, the optical-axis direction, in a large area before starting observation or at the time of starting observation. Then, time-lapse observation is performed by changing the Z-position that serves as a reference in accordance with the objective lens to be used.

CITATION LIST

Patent Literature

{PTL 1} Japanese Unexamined Patent Application, Publication No. 2011-237818

SUMMARY OF INVENTION

With the microscope system disclosed in Patent Literature 1, because the Z-positions that serve as references for the objective lenses are detected within a search range in the Z-axis direction over a large area, the detection in some cases takes time.

The present invention provides a microscope system and a method for a microscope system with which it is possible to reduce the amount of time required before starting image acquisition.

A first aspect of the present invention is a microscope system including an electrically powered stage on which a specimen is placed and with which a position of the specimen can be adjusted; a scanner that scans laser light with which the specimen placed on the electrically powered stage is irradiated; a low-magnification objective lens that focuses the laser light scanned by the scanner onto the specimen and a high-magnification objective lens having a higher magnification than the low-magnification objective lens; a revolver that supports the low-magnification objective lens and high-magnification objective lens so as to make it possible to selectively place these objective lenses in an optical path of the laser light; an image-acquisition portion that acquires an image of the specimen by detecting return light that returns from the specimen due to the irradiation with the laser light; an autofocus portion that adjusts a distance in an optical-axis direction between the revolver and the electrically powered stage based on a luminance of the return light, and that can detect focal positions of the low-magnification objective lens and the high-magnification objective lens; a storage portion that stores one of the focal positions of the low-magnification objective lens detected by the autofocus portion as a reference position for the low-magnification objective lens; a focal-position setting portion that sets the focal position at which the image is acquired by the image-acquisition portion with reference to the reference position for the low-magnification objective lens stored in the storage portion; an acquisition-position setting portion that sets acquisition positions in a direction that intersects the optical axis for partial images of the specimen that are acquired by the image-acquisition portion in divided forms based on predetermined viewing-field area; and a map-image generating portion that, when the partial images are acquired by the image-acquisition portion at the focal position set by the focal-position setting portion by moving the viewing-field areas to the acquisition positions by means of the electrically powered stage, generates a map image by arranging the acquired partial images in accordance with the acquisition positions, wherein the autofocus portion detects the focal position of the high-magnification objective lens at an observation position set on the map image with reference to the reference position for the low-magnification objective lens stored in the storage portion.

With this aspect, when the specimen is placed in the electrically powered stage, the low-magnification objective lens is placed on the optical path by means of the revolver, and the laser light is radiated onto the specimen via the scanner and the low-magnification objective lens, the autofocus portion detects the focal position of the low-magnification objective lens based on the return light of the laser light returning from the specimen. Then, the focal-position setting portion sets the focal position for image acquisition with reference to the reference position stored in the storage portion for the focal position of the low-magnification objective lens, and the acquisition-position setting portion sets the acquisition positions for the partial images of the specimen at that focal position for image acquisition.

In addition, the map-image generating portion acquires the partial images at the respective acquisition positions by moving the viewing-field area of the image-acquisition portion, and the map image of the specimen is generated by using these partial images. Then, the autofocus portion detects the focal position of the high-magnification objective lens at the observation position set on the map image, and the image-acquisition portion acquires an image. By doing so, it is possible to perform more detailed observation of a desired observation position selected from a larger observation area.

In this case, because the autofocus portion detects the focal position of the high-magnification objective lens with reference to the reference position for the low-magnification objective lens, the range in which the focal position is detected is restricted to an effective range, thus making it possible to reduce the amount of time required for the detection. Therefore, it is possible to ensure desired observation timing by reducing the amount of time required before starting the image acquisition, and, in the case in which there are multiple observation positions, it is possible to ensure sufficient simultaneity of observation among different observation positions.

In the above-described configuration, in the case in which the detected focal position of the high-magnification objective lens changes during time-lapse observation in which the image-acquisition portion acquires images at the observation position at a predetermined time interval, the autofocus portion may correct the focal position.

During the time-lapse observation, although a focus drift (shifting of focal position) occurs in some cases due to causes such as temperature changes and so forth, by employing such a configuration, it is possible to continue the time-lapse observation by keeping a certain focal position by means of the autofocus portion.

In the above-described configuration, the autofocus portion may detect the focal position of the high-magnification objective lens by taking into account a correction level for correcting a displacement between a parfocal distance of the low-magnification objective lens and a parfocal distance of the high-magnification objective lens.

By employing such a configuration, it is possible to avoid the influence of errors due to the difference in the parfocal distance between the low-magnification objective lens and the high-magnification objective lens, and thus, it is possible to detect the focal position of the high-magnification objective lens with higher precision.

In the above-described configuration, a thin, glass plate-like cover glass that covers the specimen placed on the electrically powered stage may be provided, the high-magnification objective lens may be provided with a correction ring with which it is possible to correct aberration in accordance with a thickness of the cover glass, and the autofocus portion may detect the focal position of the high-magnification objective lens by taking into account a correction level achieved by the correction ring in accordance with the thickness of the cover glass.

By employing such a configuration, it is possible to avoid the influence of errors due to aberration corrections achieved by the correction ring in accordance with the thickness of the cover glass, and thus, it is possible to detect the focal position of the high-magnification objective lens with higher precision.

In the above-described configuration, the storage portion may store, individually as reference positions, three or more different focal positions for the low-magnification objective lens detected by the autofocus portion in directions that intersect the optical axis of the laser light, and the autofocus portion may detect the focal position of the high-magnification objective lens based on the three or more reference positions for the low-magnification objective lens stored in the storage portion.

By employing such a configuration, with three or more reference positions, it is possible to ascertain the slopes at the multiple focal positions of the low-magnification objective lens that are distributed in the specimen in the directions that intersect the optical axis of the laser light. Therefore, even in the case in which the specimen is inclined or in the case in which positions at which the specimen exists are distributed in the optical-axis direction of the low-magnification objective lens, it is possible to detect the focal position of the high-magnification objective lens more precisely and to accurately perform detailed observation.

A second aspect of the present invention is a method for a microscope system including (i) an electrically powered stage on which a specimen is placed and with which a position of the specimen can be adjusted; (ii) a scanner that scans laser light with which the specimen placed on the electrically powered stage is irradiated; (iii) a low-magnification objective lens that focuses the laser light scanned by the scanner onto the specimen and a high-magnification objective lens having a higher magnification than the low-magnification objective lens; and (iv) a revolver that supports the low-magnification objective lens and the high-magnification objective lens so as to make it possible to selectively place the low-magnification objective lens or the high-magnification objective lens in an optical path of the laser light, wherein the method comprises: acquiring an image of the specimen by detecting return light that returns from the specimen due to the irradiation with the laser light; adjusting a distance in an optical-axis direction between the revolver and the electrically powered stage based on a luminance of the return light, and detecting focal positions of the low-magnification objective lens and the high-magnification objective lens; storing one of the detected focal positions of the low-magnification objective lens as a reference position for the low-magnification objective lens; setting the focal position at which the image is acquired with reference to the stored reference position for the low-magnification objective lens, setting acquisition positions in a direction that intersects the optical axis for partial images of the specimen that are acquired in divided forms based on predetermined viewing-field areas; and when the partial images are acquired at the set focal position by moving the viewing-field areas to the acquisition positions by means of the electrically powered stage, generating a map image by arranging the acquired partial images in accordance with the acquisition positions, wherein the focal position of the high-magnification objective lens is detected at an observation position set on the map image with reference to the stored reference position for the low-magnification objective lens.

In the above-described configuration, in the case in which the detected focal position of the high-magnification objective lens changes during time-lapse observation in which images are acquired at the observation position at a predetermined time interval, the focal position is corrected.

In the above-described configuration, the focal position of the high-magnification objective lens is detected by taking into account a correction level for correcting a displacement between a parfocal distance of the low-magnification objective lens and a parfocal distance of the high-magnification objective lens.

In the above-described configuration, a thin, glass plate-like cover glass that covers the specimen placed on the electrically powered stage may be provided, the high-magnification objective lens is provided with a correction ring with which it is possible to correct aberration in accordance with a thickness of the cover glass, and wherein the focal position of the high-magnification objective lens is detected by taking into account a correction level achieved by the correction ring in accordance with the thickness of the cover glass.

In the above-described configuration, storing, individually as reference positions, three or more different focal positions for the low-magnification objective lens detected in directions that intersect the optical axis of the laser light, and wherein the focal position of the high-magnification objective lens is detected based on the stored three or more reference positions for the low-magnification objective lens.

The present invention affords an advantage in that, by reducing the amount of time required before starting image acquisition, it is possible to ensure a desired observation timing and to ensure the simultaneity of observations among different observation positions.

BRIEF DESCRIPTION OF DRAWINGS

FIG. 6A is a diagram showing the manner in which a focal position of a low-magnification objective lens at a bottom surface of a cover glass is detected.

FIG. 6B is a diagram showing the manner in which the low-magnification objective lens is moved by an amount corresponding to the thickness of the cover glass.

FIG. 6C is a diagram showing the manner in which a focal position of the low-magnification objective lens at a sample is detected.

FIG. 7A is a diagram showing the manner in which a focal position of a high-magnification objective lens at a bottom surface of a cover glass is detected during the coarse adjustment.

FIG. 7B is a diagram showing the manner in which the focal position of the high-magnification objective lens at the bottom surface of the cover glass is detected during the fine adjustment.

DESCRIPTION OF EMBODIMENT

A microscope system and a method for a microscope system according to an embodiment of the present invention will be described below with reference to the drawings.

Figure 1:
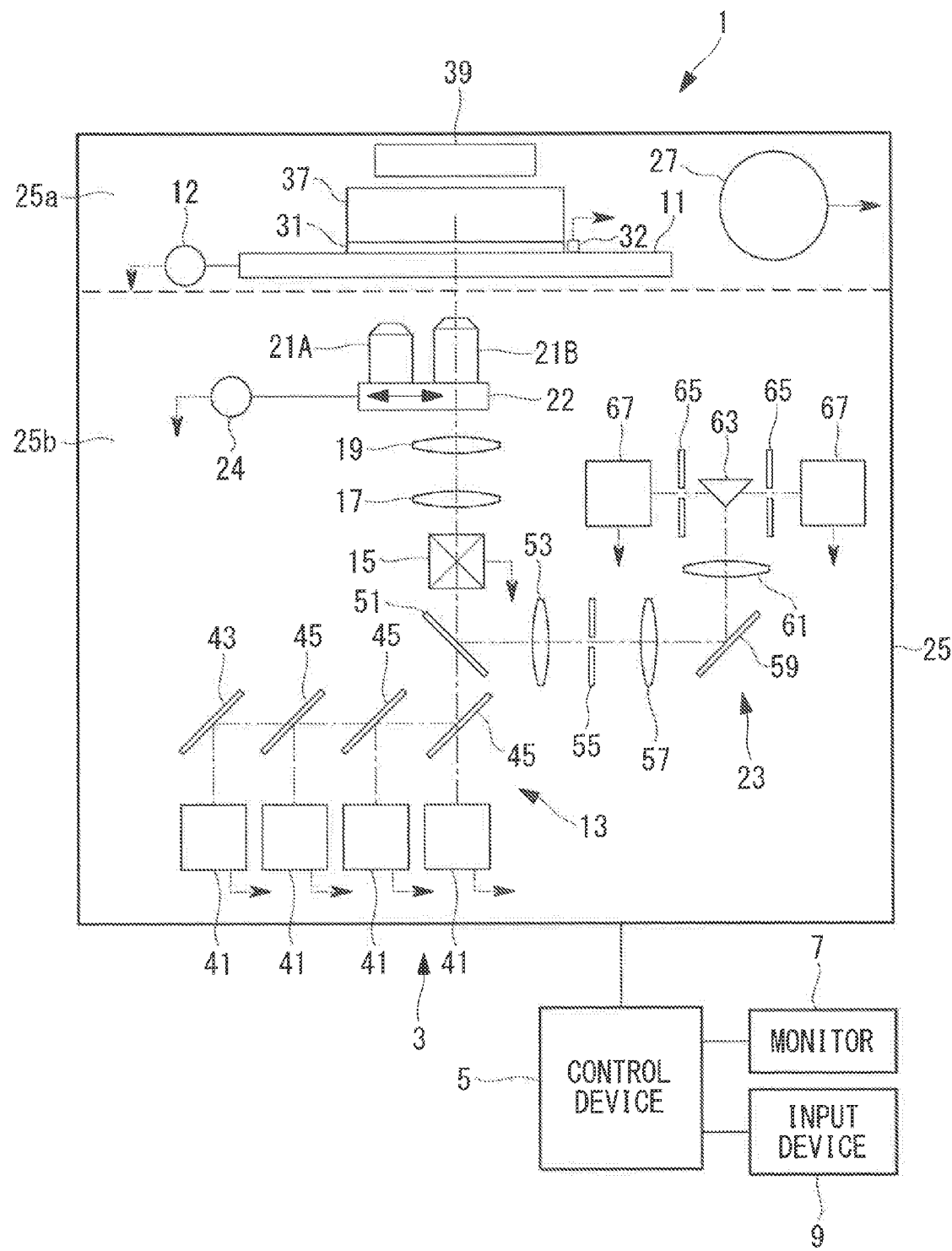
FIG. 1 is a block diagram showing a microscope system according to an embodiment of the present invention.

As shown in FIG. 1, a microscope system 1 according to this embodiment is provided with a laser scanning microscope 3, a control device 5 that controls the laser scanning microscope 3, a monitor 7 that displays an image or the like, and an input device 9 such as a mouse or keyboard. Note that, in FIG. 1, arrows associated with reference signs 12, 15, 24, 27, 32, 41, and 67 indicate connections to the control device 5.

The laser scanning microscope 3 is provided with an electrically powered stage 11 on which a sample (specimen, see FIG. 6A, etc.) S is placed, a laser light source unit 13 that emits laser light, a scanner 15 that two-dimensionally scans the laser light from the laser light source unit 13, a pupil projection lens 17 that focus the laser light scanned by the scanner 15, an imaging lens 19 that collect the laser light focused by the pupil projection lens 17, objective lenses 21A and 21B that radiate the laser light collected by the imaging lens 19 onto the sample S, an image-acquisition portion 23 that acquires an image of the sample S by detecting fluorescence generated at the sample S due to the irradiation with the laser light, and a black box 25 that accommodates these components.

The interior of the black box 25 is divided into an upper region 25a, which is an upper portion that accommodates the electrically powered stage 11, and a lower region 25b, which is a lower portion that accommodates the laser light source unit 13, the image-acquisition portion 23, and so forth. A heater 27 is provided in the upper region 25a, and the heater 27 adjusts the temperature inside the upper region 25a so as to meet predetermined culturing conditions (for example, 27° C.±0.5° C.).

Figure 2:
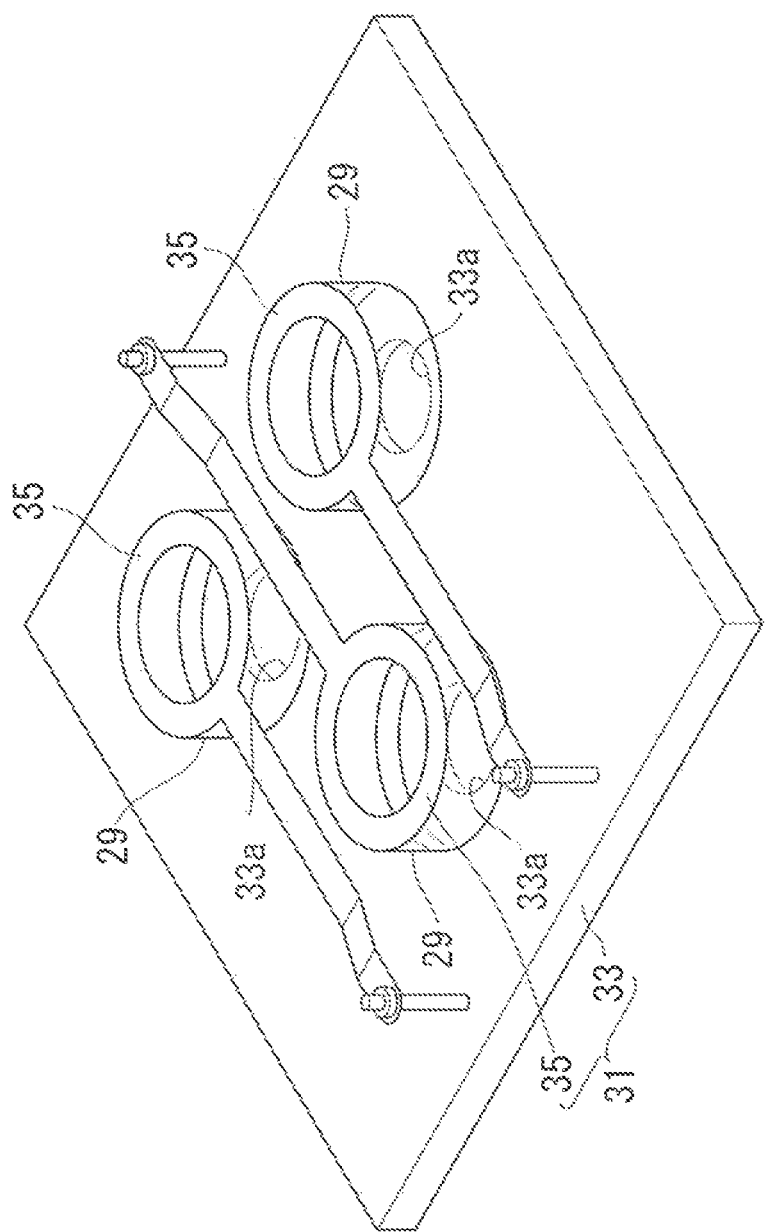
FIG. 2 is a perspective view showing, for the microscope system in FIG. 1, examples of a sample holder and containers mounted on the sample holder.

The electrically powered stage 11 is provided with, for example, three motors 12, and is made independently movable, by means of theses motors 12, along movement axes in X-, Y-, and Z-directions that are perpendicular to each other. In addition, as shown in FIG. 2, the electrically powered stage 11 includes a sample holder 31 that holds a plurality of containers 29 accommodating the samples S, and the containers 29 held by the sample holder 31 can be moved in three-dimensional directions.

The sample holder 31 is configured so that the type thereof is detected by a sensor 32 provided at the electrically powered stage 11. In addition, the sample holder 31 is provided with a tabular plate portion 33 that has through-holes 33a and holder portions 35 that secure the containers 29 on the plate portion 33 in a state in which the containers 29 are positioned in place.

The holder portions 35 are individually provided at the through-holes 33a of the plate portion 33. These holder portions 35 are configured such that they can secure the containers 29, which are disposed over the through-holes 33a so as to close the through-holes 33a, between the holder portions 35 and the plate portion 33 in the state in which the containers 29 are positioned in place.

The containers 29 are, for example, transparent petri dishes or the like, and bottom surfaces thereof are formed by cover glasses (see FIG. 6A, etc.) 29a. In addition, the containers 29 are configured so as to be accommodated in a simplified incubator 37 and to maintain culturing conditions (for example, humidity of 100% and $CO_2$ concentration of 0.5%) for the samples S. In FIG. 1, reference sign 39 indicates a phase contrast condenser for phase contrast observation. In FIG. 6A and so forth, reference sign L indicates culturing liquid.

As shown in FIG. 1, the laser light source unit 13 is provided with a plurality of laser diodes 41 that emit laser light having different wavelengths and a mirror 43 and dichroic mirrors 45 that combine laser light emitted from the plurality of laser diodes 41 into a single optical path.

The scanner 15 is, for example, a so-called proximity galvanometer mirror, in which two galvanometer mirrors that can be pivoted about axes perpendicular to each other are disposed facing each other, and is capable of scanning the laser light in the X- and Y-directions.

The objective lenses 21A and 21B can be classified into, for example, the low-magnification objective lens 21A having a low magnification and the high-magnification objective lens 21B having a higher magnification than the low-magnification objective lens 21A. The low-magnification objective lens 21A has, for example, a magnification of ×10, and the high-magnification objective lens 21B has, for example, a magnification of ×60.

These objective lenses 21A and 21B are supported by the revolver 22 so as to make it possible to selectively place them in the optical path of the laser light. The revolver 22 is provided with a focusing mechanism 24 that adjusts the distance between the electrically powered stage 11 and the revolver 22 in an optical-axis direction (Z-direction).

The image-acquisition portion 23 is provided with a beam splitter 51 that splits off, from the optical path of the laser light, return light that includes fluorescence, reflected light of the laser light, and so forth, which returns from the sample S and the container 29 via the objective lenses 21A and 21B, the imaging lens 19, the pupil projection lens 17, and the scanner 15 due to the irradiation with the laser light; a confocal lens 53 that focuses the return light that has been split off from the optical path of the laser light; a variable pinhole 55 that restricts the bundle of rays of the return light focused by the confocal lens 53; a collimating lens 57 that converts the return light that has passed through the variable pinhole 55 into a substantially collimated beam; and a grating 59 that diffracts and separates the return light, which has been converted to the substantially collimated beam, in accordance with the wavelengths.

In addition, the image-acquisition portion 23 is provided with a focusing lens 61 that focuses the return light separated by the grating 59; a beam splitter 63 that splits the return light, which has been focused by the focusing lens 61, in accordance with the wavelengths; a pinhole 65 that restricts the bundle of rays of the return light that has been split off; and an optical detector (photomultiplier tube) 67 that detects the return light that has passed through the pinhole 65.

The variable pinhole 55 is disposed so as to have an optically conjugate positional relationship with the focal positions of the objective lenses 21A and 21B. By setting the variable pinhole 55 sufficiently small, it is possible to perform confocal detection in which only the return light generated at the focal position of the objective lens 21A or 21B is allowed to pass therethrough to be detected by the optical detector 67. With the confocal detection, it is possible to acquire a confocal fluorescence image that is clear and not blurred.

Figure 3:
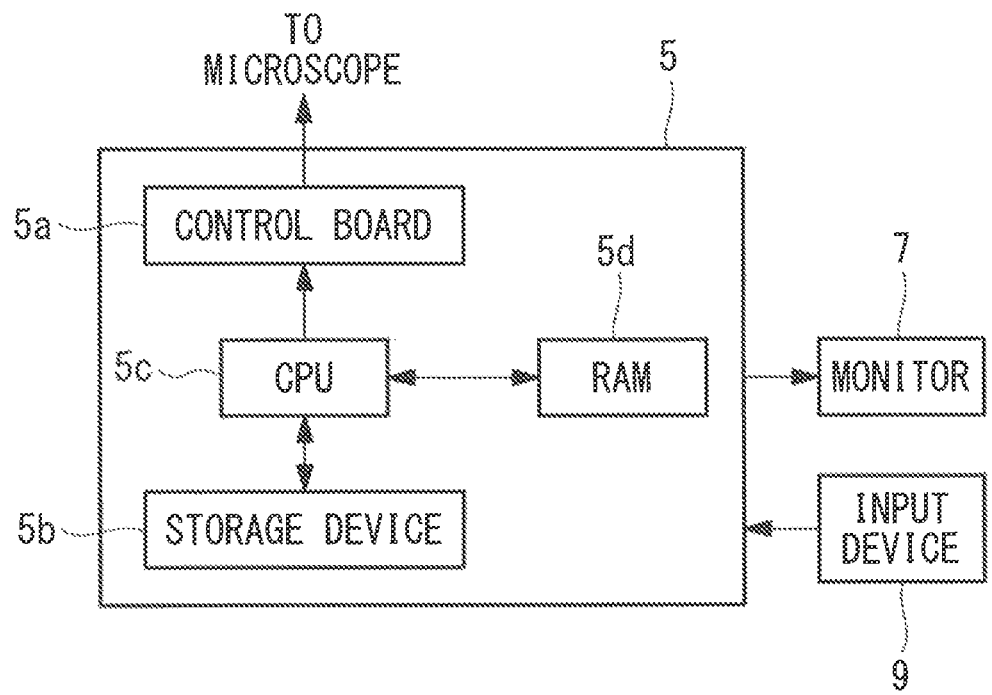
FIG. 3 is a block diagram showing a control device of the microscope system in FIG. 1.

As shown in FIG. 3, the control device 5 is provided with a control board 5a, a storage device 5b such as a hard disk drive, a CPU 5c, and a RAM 5d. The monitor 7 and the input device 9 are connected to the control device 5.

The control board 5a includes a control board for controlling various electrically powered portions (the electrically powered stage 11, the laser light source unit 13, the scanner 15, the image-acquisition portion 23, the heater 27, the sensor 32, and the focusing mechanism 24) of the laser scanning microscope 3, and a signal processing board that receives output signals from the optical detector 67 and converts them to image luminance signals.

Figure 4:
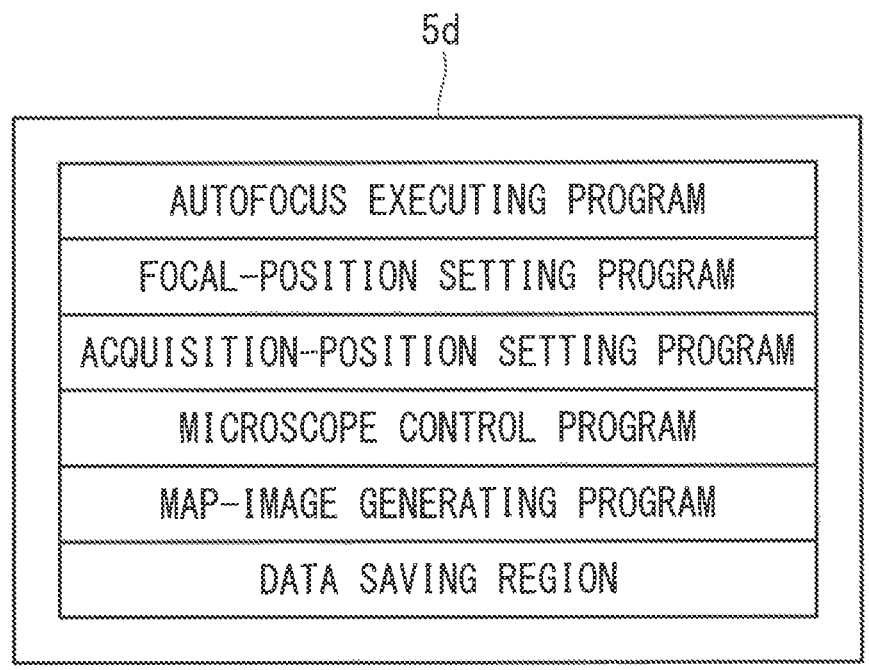
FIG. 4 is a diagram showing CPU programs stored in the storage device in FIG. 3.

As shown in FIG. 4, the storage device 5b stores programs or the like that the CPU 5c executes. Specifically, the storage device 5b stores an autofocus executing program, a focal-position setting program, an acquisition-position setting program, a microscope control program, a map-image generating program, and data.

Figure 5:
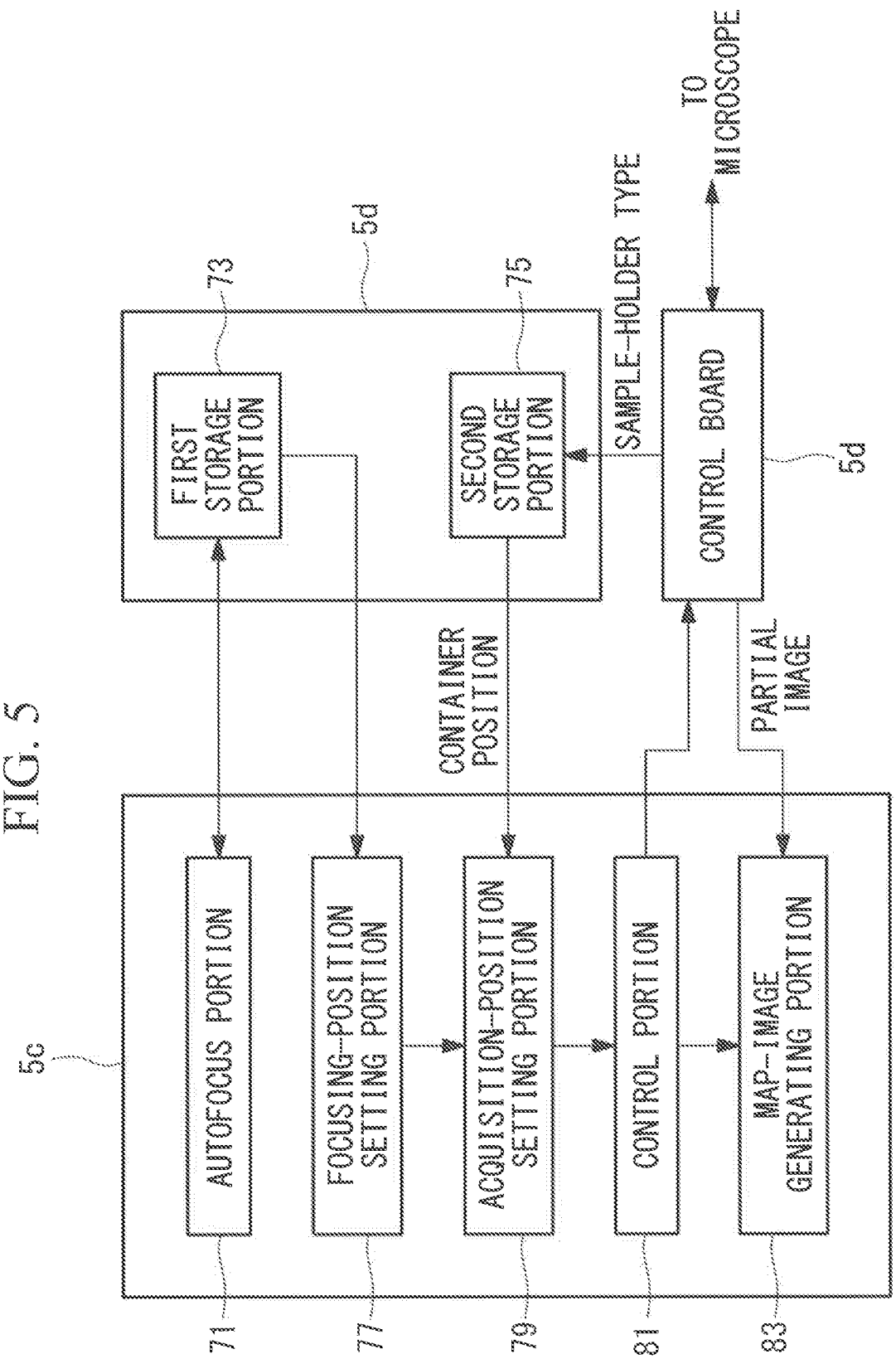
FIG. 5 is a block diagram showing functions of the CPU, the configuration of the RAM, and so forth shown in FIG. 1.

As shown in FIG. 5, the CPU 5c has a function that serves as an autofocus portion 71 that detects focal positions of the objective lenses 21A and 21B; a function that serves as a focal-position setting portion 77 that sets a focal position at which an image is acquired; a function that serves as an acquisition-position setting portion 79 that sets acquisition positions for acquiring partial images of the samples S; a function that serves as a control portion (image-acquisition portion, map-image generating portion) 81 that controls the laser scanning microscope 3 to acquire the partial images of the samples S; and a function that serves as a map-image generating portion 83 that generates map images based on the partial images.

The CPU 5c loads the above-described individual programs stored in the storage device 5b and executes each subroutine included in the function that serves as the autofocus portion 71, the focal-position setting portion 77, the control portion 81, or the map-image generating portion 83. In the following, the individual functions executed by the CPU 5c will be described as those executed by the autofocus portion 71, the focal-position setting portion 77, the acquisition-position setting portion 79, the control portion 81, and the map-image generating portion 83, respectively.

The RAM 5d includes a first storage portion 73 that stores, as a reference position for the low-magnification objective lens 21A, one of the focal positions of the low-magnification objective lens 21A detected by the autofocus portion 71 and a second storage portion 75 that stores mounted positions, at which the containers 29 are mounted on the sample holder 31, in association with the type of the sample holder 31.

The autofocus portion 71 performs control for moving at least one of the focusing mechanism 24 of the revolver 22 and the electrically powered stage 11 in the direction along the optical axis of the laser light (Z-direction). This autofocus portion 71 acquires intensity signals of the return light obtained by the optical detector 67, which is a confocal detecting means, while changing the distance between the revolver 22 and the electrically powered stage 11 in the optical-axis direction. Then, by performing the operation for searching for a position at which the signal intensity of the return light becomes the highest, the autofocus portion 71 makes it possible to detect the focal position of the objective lens 21A or 21B and to achieve a good focus. At this time, it is possible to avoid the influence of a foreign object or the like and to achieve an accurate focus by acquiring the average intensity of the return light by scanning the laser light in the X- and Y-directions by using the scanner 15 at individual positions in the Z-direction (Z-positions).

In addition, when detecting the focal position of the high-magnification objective lens 21B, the autofocus portion 71 uses, as a reference, the reference position for the low-magnification objective lens 21A stored in the first storage portion 73. In addition, in the case in which the focal position of the high-magnification objective lens 21B changes over time during time-lapse observation, the autofocus portion 71 has a correction function for correcting the changed focal positions based on the initially-set reference position for the high-magnification objective lens 21B.

As the mounted positions, the second storage portion 75 stores, for example, center positions or the like of the through-holes 33a provided in the plate portion 33 of the sample holder 31.

The focal-position setting portion 77 reads out the reference position for the low-magnification objective lens 21A stored in the first storage portion 73 of the RAM 5d and sets the focal position at which an image is acquired by using the low-magnification objective lens 21A with reference to the read-out reference position.

The acquisition-position setting portion 79 sets the acquisition positions for the partial images in the X- and Y-directions by dividing regions in the individual containers 29 into a plurality of divided regions based on the mounted positions of the containers 29 that are stored in the second storage portion 75 in association with the type of the sample holder 31 detected by the sensor 32. For example, with reference to the center positions of the individual through-holes 33a in the plate portion 33 of the sample holder 31, acquisition positions are set for 5×5=25 partial images that are next to each other. The acquisition positions of the partial images in the X- and Y-directions are changed based on the movement of the electrically powered stage 11 in the X- and Y-directions.

The control portion 81 controls the electrically powered stage 11 and the scanner 15 in accordance with the acquisition positions of the partial images set by the acquisition-position setting portion 79 to adjust the acquisition positions of the partial images and the scanning area of the laser light (the size of the viewing field).

In addition, the control portion 81 generates the partial images for the individual acquisition positions by combining the image luminance signals obtained by the optical detector 67 of the image-acquisition portion 23 and the scanning position information of the scanner 15. The order in which the acquisition positions of the partial images are moved through, that is, the order in which the partial images are acquired, may be set by a user, or it may be set by the acquisition-position setting portion 79.

Furthermore, the control portion 81 also has a function for executing time-lapse observation in which observation images at a position specified by a user are repeatedly acquired at predetermined time intervals. In addition, the control portion 81 detects focal positions of the reference surface (for example, the bottom surface of the cover glass 29a) before starting time-lapse observation and after starting time-lapse observation by using the autofocus portion 71. Then, the control portion 81 calculates a difference between the focal positions of the reference surface detected before starting time-lapse observation and after starting time-lapse observation and corrects a shift in the observation area due to a focus drift.

The map-image generating portion 83 arranges the partial images acquired by the image-acquisition portion 23 and the control portion 81 in accordance with the respective acquisition positions and, thus, generates two-dimensional map images G that cover nearly the entire area of all regions in the containers 29.

The operation of the thus-configured microscope system 1 according to this embodiment will now be described.

In order to observe the samples S by using the microscope system 1 according to this embodiment, the plurality of containers 29 in which the samples S are accommodated are set in the sample holder 31, and this sample holder 31 is mounted onto the electrically powered stage 11.

The type of the sample holder 31 is detected by the sensor 32 provided at the electrically powered stage 11. Then, the positional information of the containers 29 stored in the second storage portion 75 is read out by the acquisition-position setting portion 79 based on the type of the sample holder 31 detected by the sensor 32.

When the image-acquisition function performed by the control portion 81 (control subroutine) or the autofocus function performed by the autofocus portion 71 is executed, laser light is emitted from the laser light source unit 13 in the laser scanning microscope 3. The laser light emitted from the laser light source unit 13 passes through the beam splitter 51, the scanner 15, the pupil projection lens 17, the imaging lens 19, and the low-magnification objective lens 21A (or the high-magnification objective lens 21B) and is radiated onto the sample S from the bottom surface side of the container 29 via a cover glass 29a.

When irradiated with the laser light, a portion of the laser light is reflected at the cover glass 29a, and, in addition, a fluorescent material existing in the sample S at the position irradiated with the laser light is excited, thus generating fluorescence. Return light including this reflected light, fluorescence, and so forth returns through the optical path via the low-magnification objective lens 21A (or high-magnification objective lens 21B), the imaging lens 19, the pupil projection lens 17, and the scanner 15, and is made to enter the image-acquisition portion 23 by being split from the optical path of the laser light by the beam splitter 51.

The return light that is made to enter the image-acquisition portion 23 is focused by the confocal lens 53, and only the return light that has passed through the variable pinhole 55 is converted to a substantially collimated beam by the collimating lens 57. Then, the return light that has passed through the collimating lens 57 is subjected to spectral diffraction by the grating 59, and is detected by the individual optical detectors 67 in accordance with the wavelengths, via the focusing lens 61 and the beam splitter 63.

Next, electric currents in accordance with the incident light levels of the return light are output from the optical detector 67, and these electric currents are converted to image luminance signals at the control board 5a in the control device 5. Then, the control portion 81 (control subroutine) generates two-dimensional scanned images based on these image luminance signals and the scanning position information of the scanner 15. The generated two-dimensional scanned images are stored in the storage device 5b or the RAM 5d.

When performing the autofocus operation, the autofocus portion 71 calculates an average value of the luminance signals obtained by X-Y scans performed by the scanner 15 at a predetermined Z-position, which is the starting point, and the calculated average value is stored in the RAM 5d. Subsequently, the procedure in which the control portion 81 controls the focusing mechanism 24 or the electrically powered stage 11 to move the Z-position by a predetermined step size and in which the autofocus portion 71 calculates an average value of luminance signals that are re-obtained by the X-Y scan performed by the scanner 15 is repeated. Then, as the focal position, the autofocus portion 71 detects a Z-position at which the average value of the luminance signals is the highest.

With this laser scanning microscope 3, first, the low-magnification objective lens 21A is disposed in the optical path of the laser light by means of the revolver 22, and a map image of the sample S is generated.

First, as shown in FIG. 6A, based on reflected light of 635 nm laser light, a bottom surface of the cover glass 29a for which the average luminance of that reflected light becomes the highest is detected by the autofocus portion 71. Then, the low-magnification objective lens 21A is focused at the detected bottom surface of the cover glass 29a by means of the autofocus portion 71. The focal position (symbol × in the FIG. 6A) at the detected bottom surface of the cover glass 29a is stored in the first storage portion 73 as a reference position for the low-magnification objective lens 21A.

Next, portions above the focal position on the bottom surface of the cover glass 29a are searched by the autofocus portion 71 (specifically, the focusing operation is executed from the bottom surface of the cover glass 29a toward positions thereabove), and focusing is performed at a top surface of the cover glass 29a, as shown in FIG. 6B. Hereinafter, focal positions are indicated by the symbol × in FIGS. 6B and 6C, and FIGS. 7A and 7B.

Next, the autofocus portion 71 executes the focusing operation starting from the top surface of the cover glass 29a, which has been set previously, toward positions thereabove. Then, as shown in FIG. 6C, for the return light, a position at which the luminance of fluorescence generated at the sample S becomes the highest is detected (that is, unlike the cases shown in FIGS. 6A and 6B, the intensity of the fluorescence from the sample S is used as the focus evaluation value), and the low-magnification objective lens 21A is focused at the detected position. The focal-position setting portion 77 sets this focal position at the sample S as the focal position for the low-magnification objective lens 21A at which an image is acquired by the image-acquisition portion 23.

Next, at the focal position of the low-magnification objective lens 21A at the sample S set by the focal-position setting portion 77, acquisition positions in the X- and Y-directions, which are regions in the individual containers 29 divided into 5×5 divided regions that are next to each other, are set by the acquisition-position setting portion 79 for the partial images, based on the mounted positions of the containers 29 read out from the second storage portion 75. In the case in which 5×5 divided regions are set, there will be 25 acquisition positions for the partial images.

Next, the control portion 81 controls the electrically powered stage 11 so as to sequentially move the viewing-field area of the image-acquisition portion 23 to the individual acquisition positions set by the acquisition-position setting portion 79 for the plurality of partial images. Then, the laser light is scanned and the sample S is irradiated at the respective acquisition positions, and fluorescence from the sample S is detected by the image-acquisition portion 23 and the control portion 81, thus acquiring the partial images.

Next, the map-image generating portion 83 arranges the partial images acquired by the image-acquisition portion 23 in accordance with the respective acquisition positions. By doing so, a two-dimensional map image that covers nearly the entire region in the container 29 is generated. The generated map image is displayed on the monitor 7.

Next, in place of the low-magnification objective lens 21A, the high-magnification objective lens 21B is placed on the optical path by means of the revolver 22, and time-lapse observation of the sample S is performed.

First, the image-acquisition operation is executed by means of the control portion 81, repeated scanning (continuous and repeated acquisition of X-Y-scanned images by means of the scanner 15) is performed by the scanner 15, and a live image of the sample S acquired by the high-magnification objective lens 21B is displayed on the monitor 7. When the user specifies a position for which he/she wishes to perform detailed observation on a map image via the input device 9, the electrically powered stage 11 is moved to the specified position by means of the control portion 81, and a high-magnification image of the specified position is displayed live on the monitor 7.

The user determines an X-Y position (observation position, X-Y observation position) for which he/she wishes to perform detailed observation on the map image, and he/she manually adjusts the focusing mechanism 24 or the electrically powered stage 11 in order to set the observation area in the Z-direction at that X-Y position. Thus, the user determines the top end and bottom end, that is, an observation starting position and an observation ending position, of the Z-range to be observed in detail and inputs them via the input device 9. In addition, the user sets, via the input device 9, the time interval and the number of repetitions as time-lapse conditions for performing time-lapse observation by using the high-magnification objective lens 21B.

When the user gives an instruction to execute the time-lapse observation, the focal position for the high-magnification objective lens 21B is detected by the autofocus portion 71 in two steps, namely, coarse adjustment and fine adjustment, at the X-Y position specified on the map image with reference to the reference position for the low-magnification objective lens 21A stored in the first storage portion 73.

With the coarse adjustment, the autofocus portion 71 sets a predetermined range centered around the reference position for the low-magnification objective lens 21A as a Z-range of X-Y-Z scanning based on the reflected light of 635 nm laser light. The search range (μm) in the Z-direction used in the coarse adjustment is set by, for example, the following expression.

reference position for low-magnification objective lens 21A±(thickness of cover glass 29a)/2

Then, as shown in FIG. 7A, the bottom surface of the cover glass 29a of the container 29 at which the average luminance of the return light (reflected light) becomes the highest is detected with a large step (for example, 2 μm/step) within a range set by the above-described expression (for example, a range within reference position ±80 μm), and the high-magnification objective lens 21B is coarsely focused. In FIG. 7A, reference sign m indicates a liquid-immersion medium. It is the same in FIG. 7B.

Next, with the fine adjustment, the autofocus portion 71 sets a predetermined range centered around the focal position at the bottom surface of the cover glass 29a detected by the coarse adjustment as a Z-search range. In addition, the bottom surface of the cover glass 29a at which the average luminance of the return light (reflected light) becomes the highest is detected with a small step (for example, 0.2 μm/step) within the set Z-search range (for example, a range within reference position ±3 μm). Then, the high-magnification objective lens 21B is precisely focused at the detected bottom surface of the cover glass 29a, and this position is stored in the first storage portion 73 as the reference position for the high-magnification objective lens 21B.

Next, a first cycle of detailed time-lapse observation using the high-magnification objective lens 21B is started. In the first cycle of the time-lapse observation, images are repeatedly acquired by the image-acquisition portion 23 and the control portion 81 at a predetermined time interval in accordance with the X-Y observation position and the observation area in the Z-direction that have been set first. By doing so, it is possible to perform more detailed observation of a desired observation position selected from a greater observation area.

Subsequently, detailed observation for a second and subsequent cycles is performed in accordance with the time-lapse conditions.

First, in detailed observation in the second and subsequent cycles also, the reference position for the high-magnification objective lens 21B stored in the first storage portion 73 is set at the center of a search range, and the bottom surface of the cover glass 29a is detected again by the autofocus portion 71. In the second and subsequent cycles also, a detection operation is performed in two steps, namely, the coarse adjustment and the fine adjustment, as with the first cycle; however, the conditions may be changed so as to reduce the search range in the coarse adjustment to a range corresponding to, for example, reference position ±20 μm.

Then, with reference to the detected bottom surface of the cover glass 29a, the image-acquisition portion 23 and the control portion 81 repeatedly acquires images at a predetermined time interval as with the first cycle.

Figure 8:
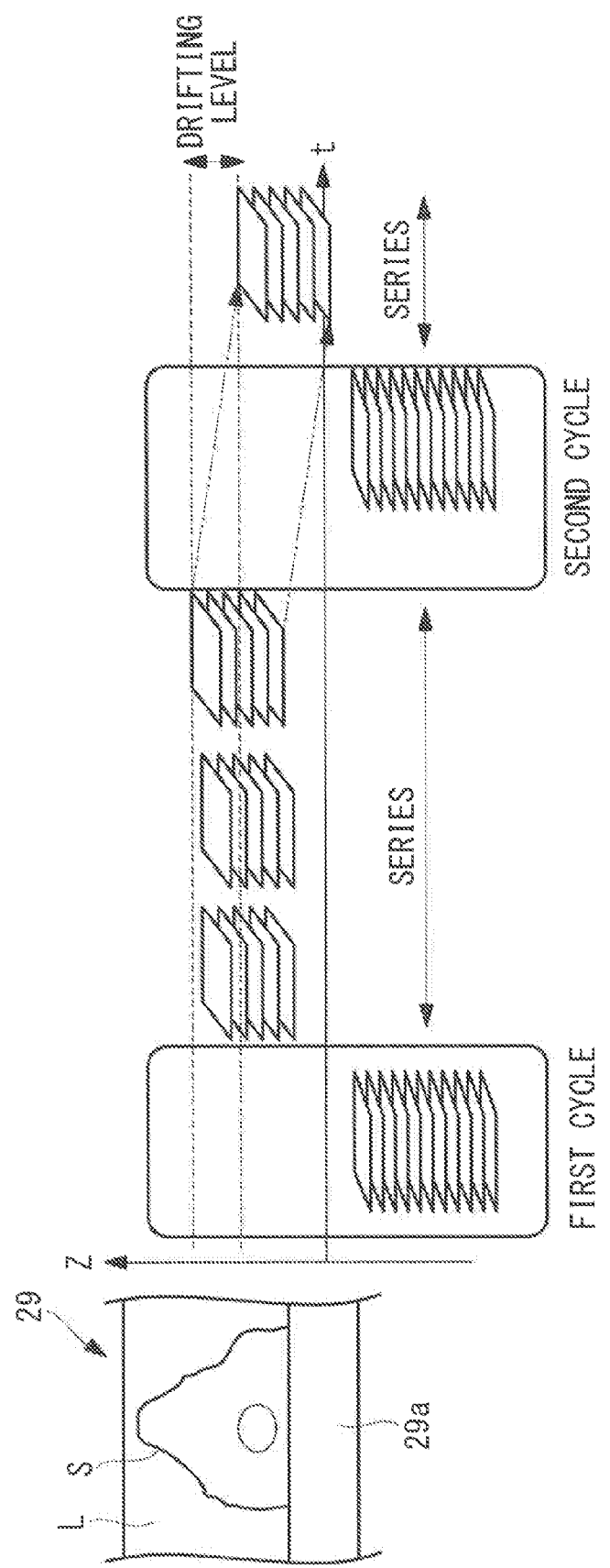
FIG. 8 is a diagram for explaining time-lapse observation in which the high-magnification objective lens is used.

Here, as shown in FIG. 8, in the second cycle of the time-lapse observation and thereafter, focus drift (shifting of focal position) sometimes occurs, thus changing the focal position of the high-magnification objective lens 21B detected by the autofocus portion 71 at the bottom surface of the cover glass 29a. In this case, drifting levels are calculated by and the control portion 81 as differences between the changed focal positions of the high-magnification objective lens 21B and the reference position for the high-magnification objective lens 21B stored in the first storage portion 73, and X-Y-Z positions for starting and ending image acquisition are corrected by the autofocus portion 71 by amounts corresponding to the drifting levels. By doing so, it is possible to continue the time-lapse observation by keeping a certain focal position.

As has been described above, with the microscope system according to this embodiment, at a desired observation position specified on a map image of the sample S generated by the map-image generating portion 83, the focal position of the high-magnification objective lens 21B is detected by the autofocus portion 71, images are acquired by the image-acquisition portion 23, and thus, it is possible to perform more detailed observation of a desired observation position selected from a greater observation area.

In this case, because the autofocus portion 71 detects the focal position of the high-magnification objective lens 21B with reference to the reference position for the low-magnification objective lens 21A, the range in which the focal position is detected is restricted to an effective range, thus making it possible to reduce the amount of time required for the detection. Therefore, it is possible to ensure a desired observation timing by reducing the amount of time required before starting the image acquisition, and, in the case in which there are multiple observation positions, it is also possible to ensure sufficient simultaneity of observation among different observation positions.

It is possible to modify this embodiment as described below.

As a first modification, by using the high-magnification objective lens 21B, for example, detailed time-lapse observation may be performed at multiple locations on a map image, instead of performing detailed time-lapse observation at one location on the map image.

In this case, the user should set multiple X-Y positions on a map image for which he/she wants to perform detailed observation, and he/she should manually adjust the Z-direction range at the respective X-Y positions. In addition, once the top end and the bottom end of a Z-range to be observed in detail by the user are set and the time-lapse conditions are set, ROIs (Regions of Interest) that indicate positions for performing the detailed observation should be displayed for the respective X-Y positions on the map image. Then, time-lapse observation should be performed by using the high-magnification objective lens 21B at the individual X-Y positions indicated by the ROIs. In this case, although a focusing operation is performed for the high-magnification objective lens 21B at the individual X-Y positions, a single reference position set by using the low-magnification objective lens 21A is commonly used for all X-Y positions as a reference position for determining a focal position search range for the high-magnification objective lens 21B.

As a second modification, the autofocus portion 71 may set a detection range for the focal position of the high-magnification objective lens 21B by taking into account a parfocal correction level for correcting a displacement between a parfocal distance of the low-magnification objective lens 21A and a parfocal distance of the high-magnification objective lens 21B. In this case, as described below, the correction level should be added to the above-described expression.

{reference position for low-magnification objective
lens 21A±(thickness of cover glass 29a)/2}+parfocal correction level By doing so, it is possible to avoid the influence of errors due to the difference in the parfocal distance between the low-magnification objective lens 21A and the high-magnification objective lens 21B, and thus, it is possible to detect the focal position of the high-magnification objective lens 21B with higher precision.

As a third modification, the high-magnification objective lens 21B may be provided with a correction ring 91 that can correct aberrations in accordance with the thickness of the cover glass 29a of the container 29, and may be connected to a motor 93 that drives the correction ring 91. In addition, the autofocus portion 71 may set the detection range for the focal position of the high-magnification objective lens 21B by taking into account correction levels achieved by the correction ring 91 in accordance with the thickness of the cover glass 29a.

In this case, the autofocus portion 71 should detect the bottom surface as well as the top surface of the cover glass 29a when detecting the focal position of the low-magnification objective lens 21A, and the thickness of the cover glass 29a should be calculated based on the bottom-surface position and the top-surface position. In addition, the correction ring 91 should be automatically adjusted to achieve a correction level in accordance with the calculated thickness of the cover glass 29a. Also, as indicated by the expression below, the amount of change in focusing due to the correction by the correction ring 91 should be added to the search range in the Z-direction for the high-magnification objective lens 21B.

{reference position for low-magnification objective
lens 21A±(thickness of cover glass 29a)/2}+
amount of change in focusing)

By doing so, it is possible to avoid the influence of errors due to the aberration correction achieved by the correction ring 91 in accordance with the thickness of the cover glass 29a, and thus, it is possible to detect the focal position of the high-magnification objective lens 21B with higher precision.

Regarding the amount of change in focusing, the autofocus portion 71 may have a table therefor, or the autofocus portion 71 may calculate it by using a calculation formula.

As a fourth modification, by moving the electrically powered stage 11 when performing the focusing operation by using the low-magnification objective lens 21A, the autofocus portion 71 may individually detect focal positions for three or more different locations in directions that intersect the optical axis of the laser light (that is, X-Y positions at three or more points). In addition, the first storage portion 73 may individually store these focal positions detected at three or more locations, as reference positions. Also, the autofocus portion 71 may set the detection range for the focal position of the high-magnification objective lens 21B based on these three or more reference positions for the low-magnification objective lens 21A stored in the first storage portion 73.

In this case, for example, based on a virtual plane that includes these three or more reference positions for the low-magnification objective lens 21A, a focusing map representing Z-coordinates of virtual reference positions corresponding to the individual X-Y positions may be created. Then, the detection range for the focal position of the high-magnification objective lens 21B may be set by setting the reference positions based on the created focusing map. Alternatively, by using reference positions whose distances from each other are small on the X-Y plane, a reference position at a target X-Y position may be determined by means of interpolation based on slopes among different reference positions.

By doing so, with three or more reference positions, it is possible to ascertain slopes at the multiple focal positions of the low-magnification objective lens 21A that are distributed in the sample S in the directions that intersect the optical axis of the laser light. Therefore, for example, even in the case in which the cover glass 29a of the container 29 is inclined or in the case in which positions at which the sample S exists are distributed in the optical-axis direction of the low-magnification objective lens 21A, it is possible to more precisely set the detection range for the focal position of the high-magnification objective lens 21B and to accurately perform detailed observation.

With this modification, time-lapse observation may be performed in detail for one location on the map image, or time-lapse observation may be performed in detail for multiple locations on the map image, as with the first modification described above.

As a fifth modification, the laser scanning microscope 3 may be provided with an autofocus light source that emits light for detecting focal positions of the objective lenses 21A and 21B by using the autofocus portion 71 and an autofocus detector that detects return light returning from the cover glass 29a and the sample S due to the irradiation with the light from the autofocus light source.

By doing so, with the autofocus light source and the autofocus detector, the focal positions of the objective lenses 21A and 21B can be detected more quickly, and time-lapse observation at a desired observation position can be performed more quickly.

As a sixth modification, instead of a user setting an X-Y position to be observed in detail on the map image, for example, the X-Y position to be observed in detail may be automatically identified on the map image by means of image processing.

REFERENCE SIGNS LIST 1 microscope system
11 electrically powered stage
15 scanner
21A low-magnification objective lens
21B high-magnification objective lens
22 revolver
23 image-acquisition portion
29a cover glass
71 autofocus portion
73 first storage portion (storage portion)
79 acquisition-position setting portion
81 control portion (map-image generating portion)
83 map-image generating portion
91 correction ring
S specimen

The invention claimed is:

1. A microscope system comprising:
an electrically powered stage configured to have a specimen placed thereon, the stage being operable to adjust a position of the specimen;
a scanner configured to scan laser light to irradiate the specimen on the electrically powered stage;
a low-magnification objective lens configured to focus the laser light scanned by the scanner onto the specimen and a high-magnification objective lens having a higher magnification than the low-magnification objective lens;
a revolver that supports the low-magnification objective lens and the high-magnification objective lens so as to make it possible to selectively place the low-magnification objective lens or the high-magnification objective lens in an optical path of the laser light;
an image-acquisition portion configured to acquire an image of the specimen by detecting first return light that returns from the specimen due to the irradiation with the laser light; and
a controller configured to: (i) adjust a distance in an optical-axis direction between the revolver and the electrically powered stage based on a luminance of second return light, and detect focal positions of the low-magnification objective lens and the high-magnification objective lens, (ii) store in a memory one of the detected focal positions of the low-magnification objective lens as a reference position for the low-magnification objective lens, (iii) set the focal position at which the image is acquired by the image-acquisition portion with reference to the reference position for the low-magnification objective lens stored in the memory, (iv) set acquisition positions in a direction that intersects the optical axis for partial images of the specimen that are acquired by the image-acquisition portion in divided form based on predetermined viewing-field areas, and (v) when the partial images are acquired by the image-acquisition portion at the set focal position by moving the viewing-field areas to the acquisition positions by means of the electrically powered stage, generate a map image by arranging the acquired partial images in accordance with the acquisition positions,
wherein the controller detects the focal position of the high-magnification objective lens at an observation position set on the map image with reference to the reference position for the low-magnification objective lens stored in the memory.

2. The microscope system according to claim 1, wherein, in a case in which the detected focal position of the high-magnification objective lens changes during time-lapse observation in which the image-acquisition portion acquires images at the observation position at a predetermined time interval, the controller corrects the focal position.

3. The microscope system according to claim 1, wherein the controller detects the focal position of the high-magnification objective lens by taking into account a correction level for correcting a displacement between a parfocal distance of the low-magnification objective lens and a parfocal distance of the high-magnification objective lens.

4. The microscope system according to claim 1, further comprising:
a thin, glass plate-like cover glass that covers the specimen placed on the electrically powered stage; and
a correction ring which is provided to the high-magnification objective lens and is operable to correct aberration in accordance with a thickness of the cover glass,
wherein the controller detects the focal position of the high-magnification objective lens by taking into account a correction level achieved by the correction ring in accordance with the thickness of the cover glass.

5. The microscope system according to claim 4, wherein the cover glass is provided at a bottom surface of a container that accommodates the specimen, and covers the specimen from underneath.

6. The microscope system according to claim 1, wherein the memory stores, individually as reference positions, three or more different focal positions for the low-magnification objective lens detected by the controller in directions that intersect the optical axis of the laser light, and the controller detects the focal position of the high-magnification objective lens based on the three or more reference positions for the low-magnification objective lens stored in the memory.

7. A method for a microscope system which comprises: (i) an electrically powered stage configured to have a specimen placed thereon, the stage being operable to adjust a position of the specimen; (ii) a scanner configured to scan laser light to irradiate the specimen on the electrically powered stage; (iii) a low-magnification objective lens configured to focus the laser light scanned by the scanner onto the specimen and a high-magnification objective lens having a higher magnification than the low-magnification objective lens; and (iv) a revolver that supports the low-magnification objective lens and the high-magnification objective lens so as to make it possible to selectively place the low-magnification objective lens or the high-magnification objective lens in an optical path of the laser light, wherein the method comprises:
acquiring an image of the specimen by detecting first return light that returns from the specimen due to the irradiation with the laser light;
adjusting a distance in an optical-axis direction between the revolver and the electrically powered stage based on a luminance of second return light, and detecting focal positions of the low-magnification objective lens and the high-magnification objective lens;

storing one of the detected focal positions of the low-magnification objective lens as a reference position for the low-magnification objective lens;

setting the focal position at which the image is acquired with reference to the stored reference position for the low-magnification objective lens, setting acquisition positions in a direction that intersects the optical axis for partial images of the specimen that are acquired in divided form based on predetermined viewing-field areas; and when the partial images are acquired at the set focal position by moving the viewing-field areas to the acquisition positions by means of the electrically powered stage, generating a map image by arranging the acquired partial images in accordance with the acquisition positions, wherein the focal position of the high-magnification objective lens is detected at an observation position set on the map image with reference to the stored reference position for the low-magnification objective lens.

8. The method according to claim 7, wherein, in a case in which the detected focal position of the high-magnification objective lens changes during time-lapse observation in which images are acquired at the observation position at a predetermined time interval, the focal position is corrected.

9. The method according to claim 7, wherein the focal position of the high-magnification objective lens is detected by taking into account a correction level for correcting a displacement between a parfocal distance of the low-magnification objective lens and a parfocal distance of the high-magnification objective lens.

10. The method according to claim 7, wherein the microscope system further comprises a thin, glass plate-like cover glass that covers the specimen placed on the electrically powered stage, wherein the high-magnification objective lens is provided with a correction ring which is operable to correct aberration in accordance with a thickness of the cover glass, and wherein the focal position of the high-magnification objective lens is detected by taking into account a correction level achieved by the correction ring in accordance with the thickness of the cover glass.

11. The method according to claim 10, wherein the cover glass is provided at a bottom surface of a container that accommodates the specimen, and covers the specimen from underneath.

12. The method according to claim 7, further comprising storing, individually as reference positions, three or more different focal positions for the low-magnification objective lens detected in directions that intersect the optical axis of the laser light, and wherein the focal position of the high-magnification objective lens is detected based on the stored three or more reference positions for the low-magnification objective lens.

* * * * *